United States Patent [19]

Krämer

[11] Patent Number: 5,012,913

[45] Date of Patent: May 7, 1991

[54] TROUGH AND PROCESS FOR SEPARATING BULK GOODS

[76] Inventor: Norbert Krämer, Röntgenstrasse 68, D-6100 Darmstadt 12, Fed. Rep. of Germany

[21] Appl. No.: 427,841

[22] PCT Filed: Apr. 2, 1988

[86] PCT No.: PCT/DE88/00216

§ 371 Date: Oct. 25, 1989

§ 102(e) Date: Oct. 25, 1989

[87] PCT Pub. No.: WO88/07967

PCT Pub. Date: Oct. 20, 1988

[30] Foreign Application Priority Data

Apr. 8, 1987 [DE] Fed. Rep. of Germany ....... 3711827
Apr. 8, 1987 [DE] Fed. Rep. of Germany ... 8705219[U]

[51] Int. Cl.[5] .............................................. B65G 11/00
[52] U.S. Cl. ..................... 193/2 R; 198/443; 198/533; 198/535; 198/771
[58] Field of Search ............... 198/443, 453, 533–535, 198/752, 771; 193/2 R, 2 B, 10; 221/288, 180, 182

[56] References Cited

U.S. PATENT DOCUMENTS 2,456,031 12/1948 Spain .
2,886,208 5/1959 Sinclair ............................. 221/288
3,767,029 10/1973 Ownen .
4,352,440 10/1982 Fukai et al. ......................... 198/443
4,378,871 4/1983 Clark ................................... 193/2 R

FOREIGN PATENT DOCUMENTS 893028 7/1949 Fed. Rep. of Germany .
1481109 1/1969 Fed. Rep. of Germany .
3048865 7/1982 Fed. Rep. of Germany ...... 221/288
3321463 12/1984 Fed. Rep. of Germany .
1274981 8/1986 Fed. Rep. of Germany .
2492777 4/1982 France ................................. 221/288

Primary Examiner—Joseph E. Valenza
Attorney, Agent, or Firm—Peter K. Kontler

[57] ABSTRACT

A device for singularizing bulk material includes an elongated trough having a longitudinal axis and a discharge end. The trough has an arcuate cross section and is inclined so as to slope downwards towards its discharge end. The upper end of the trough is connected to a motor which is capable of rotating the trough back-and-forth on its longitudinal axis. In operation, the trough is rotated back-and-forth and the bulk material is introduced into the trough at the upper end thereof. Due to the inclination and back-and-forth movement of the trough, the particles of the bulk material travel towards the discharge end of the trough along zigzag paths thereby allowing the trough to be shortened. The back-and-forth movement of the trough also causes the particles to bump into one another and push each other aside during the course of travel so that effective singularization is achieved.

8 Claims, 2 Drawing Sheets

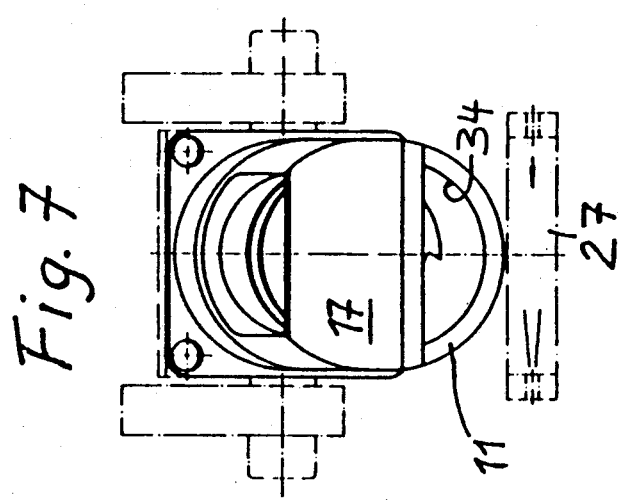
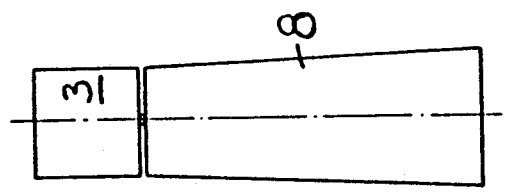
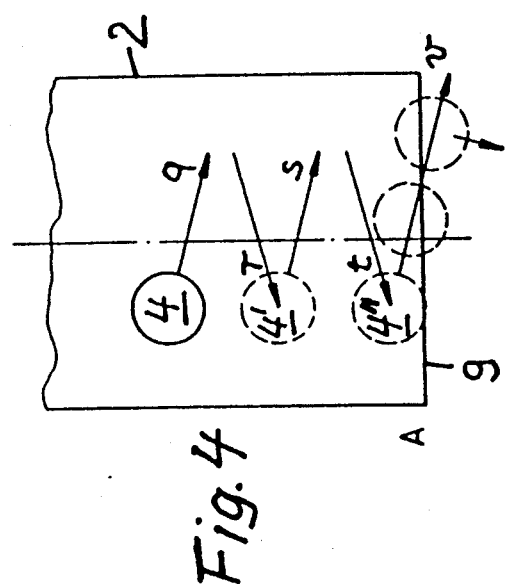
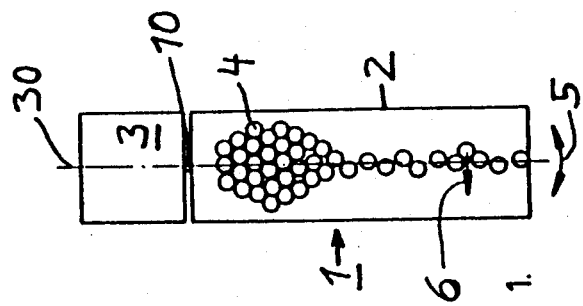
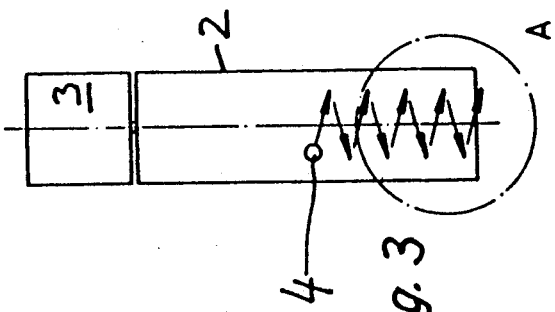

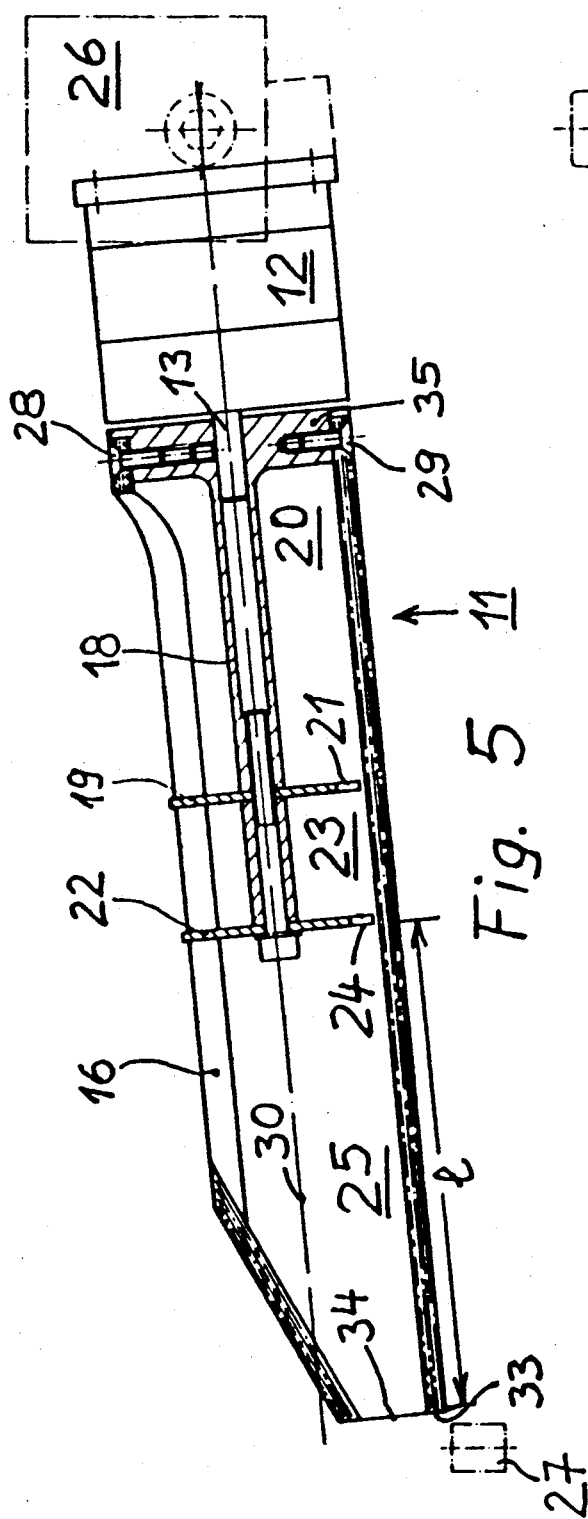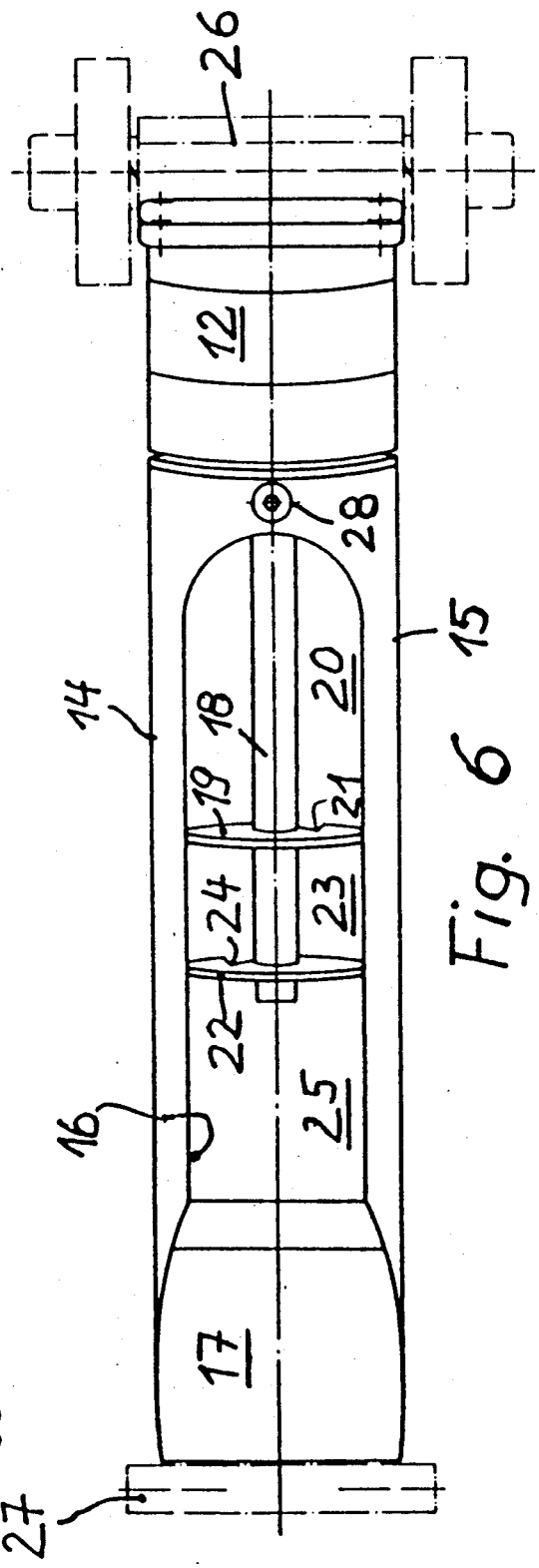

TROUGH AND PROCESS FOR SEPARATING BULK GOODS

BACKGROUND OF THE INVENTION

The invention relates to a trough which is held at its upper end for movement back-and-forth on an axis and is downwardly sloped along an inclined plane with its discharge edge being movable back-and-forth, and to a process for singularizing bulk goods.

To singularize bulk goods of relatively small volume, it is known to place the bulk material in reciprocating troughs which slope along an inclined plane and are capable of performing back-and-forth movements. The movements of the troughs can have a relatively high frequency and small amplitude and the troughs must be long for singularization. In order to singularize heaped tablets in the packing industry, for example, troughs of at least one meter or more in length are used.

The West German Offenlegungsschrift No. 3 321 463 discloses a trough for singularizing bulk goods which is sloped along an inclined plane, is pivotally held at its upper end and can be moved up-and-down by means of a pneumatic cylinder constituting an oscillator. The oscillatory motion of the trough takes place essentially perpendicular to the direction of advance of the bulk material.

The drawback of such troughs is that these must be long in order to achieve adequate singularization. Consequently, machines of this type require a large amount of room. Furthermore, due to the large number of movements of the trough, damage to the bulk material, such as chipping, dust formation or the like, is relatively frequent so that the singularized objects must be separated from broken material at the end of the singularizing zone.

The U.S. Pat. No. 2,456,031 teaches a conveyor for aligning, separating and advancing edible commodities and consisting of a movable frame of parallel guide members defining a grate whose rear portion is sloped along an inclined plane and merges into a horizontal portion which is pivotable back-and-forth horizontally. A drive belt driven by a motor located below the inclined plane of the conveyor runs beneath the guide members on which the goods are deposited. This conveyor is not suited for the singularization of tablets, pills, suppositories or grains.

OBJECT OF THE INVENTION

It is an object of the invention to provide a trough and a process which are designed to singularize bulk goods, such as tablets, pills, suppositories or grains, and achieve singularization of the individual objects along a short span; the number of movements required to singularize the objects is to be reduced and the length of the singularizing span is to be significantly decreased as compared to known singularizing troughs; likewise, virtually no more breakage of the bulk material is to occur.

SUMMARY OF THE INVENTION

The inventive trough and process for singularizing bulk goods possess a number of significant advantages. The trough is rotated back-and-forth on its longitudinal axis so that the discharge edge of the trough is moved back-and-forth with the amplitude of the trough being locally the same. Consequently, the individual objects of the bulk material slide back-and-forth transverse to the longitudinal direction of the trough and this back-and-forth movement of the individual objects increases the length of the singularizing path manyfold over the length of the trough.

Moreover, it is most advantageous for the bulk material to be lifted during each back-and-forth movement. In this manner, the individual objects of the bulk material acquire potential energy in addition to their kinetic energy and, when this potential energy is again converted into kinetic energy, it enables an individual object to press objects located laterally, above, below and in front of the same to the side thereby significantly accelerating and improving the singularizing procedure. This lifting of the bulk material during each back-and-forth movement is most easily achieved by constructing the trough as a hollow cylinder or as an oval with laterally curved side walls. The individual objects of the bulk material then, to a degree, travel up the side walls during each back-and-forth movement of the trough and, when the objects slide down upon onset of the opposite movement of the trough, an individual object is now in a position to push away objects lying above, below and next to the same.

The trough in accordance with the invention thus possesses the distinct advantage that its length is only a fraction of that of comparable prior art troughs so that the trough of the invention saves on space and cost.

Furthermore, it is possible for the trough to have an extremely simple construction since it rotates back-and-forth using the longitudinal axis as an axis of rotation. The most rapid singularization of the individual objects is achieved when the trough as an oval cross section and curved side walls or a circular cross section and a cylindrical wall. In this manner, the length of the trough can be reduced by three-fourths to four-fifths and more as compared to comparable troughs of the prior art.

Due to the back-and-forth movement of the trough required for singularization, the trough of the invention has the further advantage that there is practically no more breakage of the bulk material and, as a consequence, no more waste.

Another advantage of the trough in accordance with the invention is that a product change can be accomplished quickly. To this end, the trough is simply rotated through 180 degrees so that all objects still remaining therein fall out through the opening in its upper region thereby leaving the trough free to receive the new bulk material.

The singularization of an individual object and dropping of the same over the discharge edge of the trough down onto a conveyor belt, for example, is detected in conventional manner by a recording instrument.

BRIEF DESCRIPTION OF THE DRAWING

FIG. 1 is a schematic illustration of a trough capable of rotating on its longitudinal axis, FIG. 2 is a schematic showing of a trough in which the diameter of the lower end is greater than that of the upper end, FIG. 3 is a showing of the movement of an individual object in a trough during rotation of the latter using its longitudinal axis as an axis of rotation, FIG. 4 is an enlarged illustration of the area A in FIG. 3, FIG. 5 is a longitudinal section through an industrial form of a trough whose longitudinal axis constitutes an axis of rotation, FIG. 6 is a plan view of the trough of FIG. 5 and
FIG. 7 is a front view of the trough of FIG. 5.

DESCRIPTION OF PREFERRED EMBODIMENTS

FIG. 1 schematically shows an embodiment of a singularizing device 1 consisting of a trough 2 and a motor 3. The trough is secured to the motor 3 via a shaft 13 (FIG. 5) defining a rotational axis 10.

The motor 3 can rotate the trough 2 about the rotational axis 10 which coincides with the longitudinal axis 30 of the trough 2. The back-and-forth rotary movement of the trough 2 is indicated by the curved, double-headed motion arrow 5. Bulk material 4 is disposed in the trough and consists of individual objects 4 which are to be singularized. Fundamentally to this end, the trough 2—also in all other examples—is somewhat sloped along an inclined plane so that the lower discharge edge or end of the trough is at a lower level than the upper end of the trough into which the bulk material is admitted.

When the trough is at rest, the frictional force of the bulk material or the individual objects against the bottom of the trough is greater than the potential energy of the individual objects 4 due to the slope of the trough so that these remain at rest and do not automatically slide down to the lower end of the trough under the influence of gravity. If the trough 2 is now rotated back-and-forth on its longitudinal axis 30 according to the curved double-headed motion arrow 5, then the individual objects in FIGS. 3 and 4 slide down the inclined plane under the influence of gravity, on the one hand. On the other hand, a lateral back-and-forth movement is respectively superimposed on this downward movement as indicated by the vectors q,r,s,t and v in FIG. 4. An individual object 4 moves along the vector q, for example, during the forward movement and along the vector r during the backward movement so that the individual object 4 assumes the position 4' after the first back-and-forth movement and the position 4" after the second back-and-forth movement. The object slides down a short span of the inclined plane during travel from the position 4 to the position 4' and from the position 4' to the position 4", respectively. The vectors q,r,s,t and v thus form a meandering path with constant change in direction which is likewise shown in FIGS. 3 and 4. A force which is indicated by the directional arrow 6 in FIG. 1 and is directed transverse to the direction of the inclined plane is accordingly exerted on the individual object 4 during each back-and-forth movement. If, during downward movement of the objects, an individual object becomes laterally surrounded by an accumulation of others, the objects bang into one another during each back-and-forth movement with the result that they push each other away and become singularized as illustrated in FIG. 1. The objects ultimately slide down the inclined plane.

This procedure is most effectively assisted and improved when the trough has an arcuate cross section and is constructed as a cylindrical tube, for example. During each back-and-forth movement of the trough on its longitudinal axis as an axis of rotation, the individual objects then move up the wall to a degree and thereby acquire, in addition to their kinetic energy, a potential energy which, upon reversal of the movement of the trough, is again converted into kinetic energy. Those elements which have experienced the greatest increase in potential energy laterally now also possess greater kinetic energy to effectively push away laterally accumulated objects and thereby highly effectively accelerate the singularizing procedure. Due to the arcuate wall of the trough—regardless of whether this is cylindrical or oval—objects lying at different distances from the central axis of the trough also acquire different incremental amounts of potential so that, upon conversion of this potential energy into kinetic energy, the objects experience different accelerations and speeds when sliding down the side walls. The object with the greatest kinetic energy can accordingly force its way into the stream or line of objects along the center line of the trough while pushing neighboring objects to the side thereby leading to a rapid and highly effective singularization of the objects within a short singularizing span.

The curvature of the trough, in particular, causes a shortening of the singularizing span for an individual object because the different incremental potential energy imparted to each object allows the same to accelerate and move at different rates in directions of movement transverse to the longitudinal direction of the trough.

FIG. 2 shows a trough 8 whose cross section is enlarged in the region of the lower discharge edge. As a result, further specific variations in movement are achieved. For example, as compared to the embodiment of the trough in FIG. 1, the individual objects are drawn farther apart.

FIGS. 5 to 7 illustrate a preferred industrial embodiment of a trough 11 which is rotatable using its longitudinal axis 30 as an axis of rotation.

The singularizing device of FIGS. 5 to 7 consists of a trough 11 which is preferably a cylindrical tube. The cylindrical jacket has an elongated opening 16 in its upper region so that the cylindrical jacket is divided into two arcuate side walls 14,15.

The lower portion of the trough is covered with a cover 17 (FIG. 6) extending from top to bottom at an inclination while leaving a gap 34 through which the singularized objects of the bulk material can fall out over the discharge edge 33. FIG. 7 is a view of this slit 34 and the trough 11 from the front. The opening 16 serves for filling of the trough 11. A motor 12 is appropriately held in a pivotable holder 26 and the motor 12 has a projecting rotary motor shaft 13. A disc-shaped holder 35 is mounted on the rotary motor shaft 13 and has a central rod 18 which constitutes an extension of the rotary motor shaft 13 and thus likewise extends in the direction of the rotational axis 30 of the trough 11. The upper end of the trough 11 is preferably slipped onto the holder 35 and tightly screwed by means of screws 28,29.

The motor 12 can set the rotary motor shaft 13 into back-and-forth rotary movements at a predetermined frequency, which can be low, and the rotary movements are transmitted to the trough 11; a movement cycle of the trough 11, that is, a complete back-and-forth movement, is preferably carried out in 0.5 to 3 seconds. Accordingly, the trough 11 performs back-and-forth rotary movements on its longitudinal axis 30. The motor 12 can advantageously be a stepping motor whose rotary motor shaft 13 is capable of performing a large number of steps at small to very small angles of rotation per step. The steps are transmitted to the trough 11 as a light or fine chatter which additionally helps singularization of the objects of the bulk material in an advantageous manner.

On the rod 18 are two circular discs 19,22 whose diameter is equal to or less than the inner diameter of the trough 11 although, if necessary, the discs 19,22 can project beyond the upper edge of the opening 16 as seen in FIG. 5. Each of the discs 19,22 has a respective peripheral passage 21,24 which is situated approximately in the area of the deepest location of the respective disc 19,21 or of the trough 11. The passages 21,24 of the two discs can be so arranged relative to one another that they form a baffle in axial direction, i.e., that the two passages are offset in a projection of the discs upon one another. This has the result that the individual objects of the bulk material can only pass by the discs bit-by-bit thereby already preparing for singularization.

This construction makes it possible to fill a large quantity of bulk material into the receiving chamber 20. If necessary, a hopper can be installed above the receiving chamber. The disc 19, together with the associated walls 14,15 of the trough 11, defines a collecting or receiving chamber 20 for the bulk material. The two discs 19 and 22, together with the associated walls 14,15 of the trough 11, enclose a further collecting chamber 23 which serves to already thin out the bulk material. A singularizing chamber 25 of length 1 (FIG. 5) can adjoin the disc 22 and its passage 24 and extends from the disc 22 to the lower discharge edge 33 of the trough 11.

A conveyor belt 27, onto which the singularized, individual objects of the bulk material fall, can be located below the discharge edge 33 in conventional fashion. Falling of the individual objects can be monitored and recorded in known manner by means of a recording instrument.

The operation of the device is as follows:

Bulk material is fed into the receiving chamber 20 through the opening 16 of the trough 11. If the trough 11 is now rotated back-and-forth on its rotational axis 30 by the motor 12, singularized objects of the bulk material arrive in the collecting chamber 23 through the first passage 21 in the disc 19. This singularization is assisted by the light or fine chatter imparted to the trough 11 when a stepping motor is employed. From there, the objects arrive, via the passage 24 of the disc 22, at the actual singularizing chamber 25 and the singularizing span or path 1 after being singularized once again. During the back-and-forth rotary motion, which is divided into a large number of steps, the individual objects are now moved down the inclined plane of the trough 11 while being pushed, and moved up and down the side walls 14,15, as described with reference to FIGS. 1 and 4. Due to the lateral movements, which are symbolized by the vectors q,r,s,t and v in FIG. 4, the objects push away from one another completely and are singularized and thus fall down over the discharge edge 33 of the trough 11 onto the conveyor belt 27 individually. Preferably, a complete motion cycle of the trough—divided into a large number of steps—lasts between 0.5 and 3 seconds.

The invention can be used wherever bulk goods of relatively small volume, particularly pills, tablets or suppositories, must be singularized in order to inspect or pack a specified number of the same. This is the case especially in the pharmaceutical industry where pills, tablets or suppositories must be tested in accordance with a number of criteria after production. Thus, the weight and the crushing strength of tablets or suppositories must be continuously monitored during production. To this end, a specific number are sorted from the continuous production line using statistical methods and subsequently sent to a testing machine after being strictly singularized. The invention is particularly well-suited to strictly singularize such samples for a following testing machine such as a tablet testing machine.

I claim:

1. Device for singularizing tablets, pills, suppositories, grains and analogous bulk goods, comprising a trough having an upper end and a discharge end for singularized goods, said trough sloping downwardly toward said discharge end and having a longitudinal axis; and a motor having a rotary shaft connected with the upper end of said trough and arranged to impart to said trough cyclical back and forth movements about a rotational axis extending along said longitudinal axis, each of said cyclical movements lasting between approximately 0.5 and 3 seconds.

2. The device of claim 1, wherein said trough is a hollow cylinder having an upper region provided with a filling opening for bulk goods.

3. The device of claim 1, further comprising a disc-shaped holder affixed to said trough and mounted on said shaft, said holder having a central rod constituting an extension of said shaft and defining said rotational axis, and further comprising discs provided on said rod remote from said discharge end and having peripheral passages for bulk goods, said discs and said trough defining receiving chambers and a singularizing chamber for bulk goods, said singularizing chamber being located between said discharge end and said receiving chambers and defining an elongated singularizing path.

4. A device for singularizing tablets, pills, suppositories, grains and analogous bulk goods, comprising a trough having an upper end, a discharge end for singularized goods and an oval cross section with curved side walls, said trough sloping downwardly toward said discharge end and having a longitudinal axis; and a motor secured to and having means for rotating said trough back and forth about a rotational axis extending along said longitudinal axis.

5. A device for singularizing tablets, pills, suppositories, grains and analogous bulk goods, comprising a trough having an upper end and a discharge end for singularized goods, said trough sloping downwardly toward said discharge end and having a longitudinal axis and an internal surface along which the goods can slide toward said discharge end; a coating of antistatic agent on said internal surface; and a motor secured to and having means for rotating said trough back and forth about a rotational axis extending along said longitudinal axis.

6. A device for singularizing tablets, pills, suppositories, grains and analogous bulk goods, comprising a trough having an upper end, a discharge end for singularized goods and a longitudinal axis, said trough sloping downwardly toward said discharge end; and a stepping motor secured to and having means for imparting to said trough cyclical back and forth movements about a rotational axis extending along said longitudinal axis, including means for imparting to said trough a large number of steps during each cyclical back and forth movement of the trough.

7. A method of singularizing tablets, pills, suppositories, grains and analogous bulk goods in a trough which has a longitudinal axis, which is held at an upper end thereof, which slopes downwardly from the upper end thereof and which has a discharge end for singularized goods, comprising the step of rotating the trough back and forth about a rotational axis extending along the longitudinal axis of the trough so that bulk material is moved laterally of the longitudinal axis during each back and forth movement of the trough while simultaneously advancing toward the discharge end of the trough.

8. The method of claim 7, wherein said rotating step includes cyclically moving the trough back and forth about the rotational axis at a speed such that each cycle lasts between 0.5 and 3 seconds.

* * * * *